May 29, 1934.  S. P. SHACKLETON ET AL  1,960,350
AUTOMATIC BALANCING ARRANGEMENT
Filed Oct. 22, 1932

INVENTORS
S. P. Shackleton and
BY P. G. Edwards
ATTORNEY

Patented May 29, 1934

1,960,350

UNITED STATES PATENT OFFICE 1,960,350

AUTOMATIC BALANCING ARRANGEMENT

Samuel Paul Shackleton, Wyoming, and Paul Griffith Edwards, Millburn, N. J., assignors to American Telephone and Telegraph Company, a corporation of New York Application October 22, 1932, Serial No. 639,140

6 Claims. (Cl. 172—239)

This invention relates to electrical testing and signaling systems and more particularly to means for automatically preserving the balance of an electrical network such as for instance a Wheatstone bridge, said network being capable of being used for any of a variety of purposes.

While this invention is shown and described in one particular embodiment merely for the purpose of illustration, it will be understood that this invention may be applied to other and widely varied organizations without departing from the spirit of the invention or the scope of the appended claims.

In accordance with this invention in the embodiment here described for the purpose of illustration, a Wheatstone bridge arrangement is kept in a balanced condition through the agency of apparatus principally comprised of a reversible driving motor and means for controlling the motor consisting of differentially connected gas-filled trigger type tubes fed by an amplifier if the tubes themselves are insufficiently sensitive. Two general arrangements are described: One in which the balancing is done in steps of predetermined size, and another where the apparatus is sensitive to any small changes and will remain closely balanced.

Figure 1:
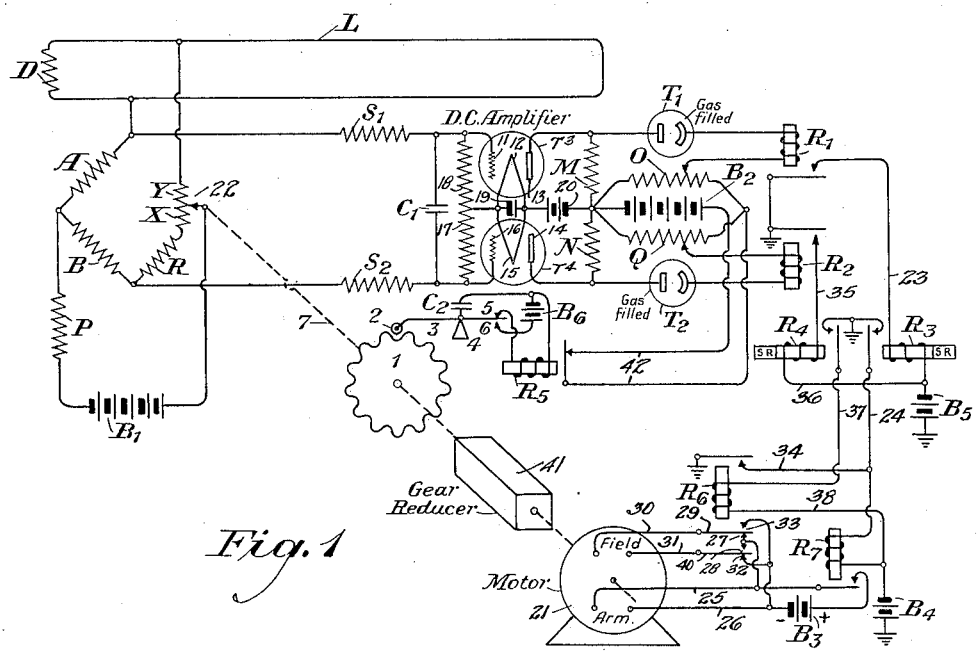
Figure 2:
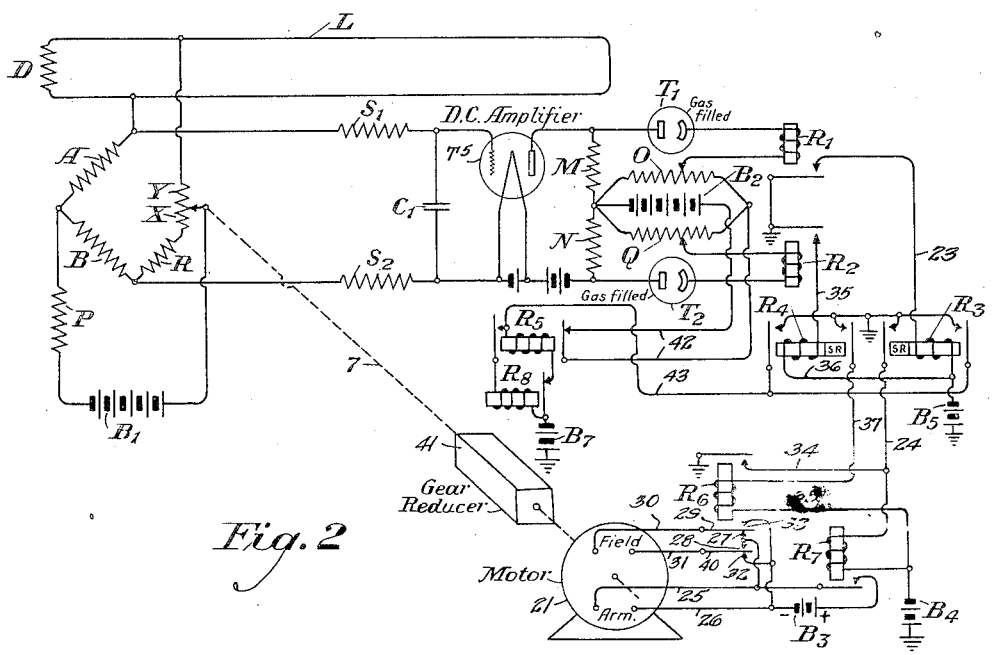

The invention may be more fully understood from the following description together with the accompanying drawing in the Figures 1 and 2 of which the invention is illustrated. Fig. 1 is a circuit diagram showing a preferred form of the invention. Fig. 2 is a circuit diagram showing the invention in modified form. Similar reference characters have been used to denote like parts in both of the figures.

With particular reference to Figs. 1 and 2, resistances A and B form the ratio arms of a Wheatstone bridge. In this particular example the resistance to be balanced consists of a line L and a fixed resistance D in parallel therewith, such an arrangement as might be encountered for instance in connection with a pilot wire regulator system for use in connection with telephone repeater systems. Since the variation in this combination is usually small the primary balance is secured by a fixed resistance R and the final balance by a potentiometer, X—Y, with X in series with R and with Y in series with L and D. A battery $B_1$, and a protective resistance P, comprise one diagonal of the bridge, and the other diagonal is led off through a network comprising resistances $S_1$ and $S_2$ and condenser $C_1$ to an amplifier of the direct type.

The amplifier may be of the single tube or push-pull type. A push-pull amplifier is shown in Fig. 1. It comprises the vacuum tubes $T_3$ and $T_4$. Tube $T_3$ has a grid 11, a cathode 12, and a plate 13. Tube $T_4$ has a grid 16, a cathode 15, and a plate 14. The filament battery is 19, and the plate battery is 20. Current limiting resistances 17 and 18 are shown in the input circuits of the tubes. The operation of an amplifier of this type is well known in the art. In the output circuit of tube $T_3$ is the resistance M. In the output circuit of tube $T_4$ is the resistance N. A gas-filled discharge tube $T_1$ has its electrodes connected across resistance M. In order to provide a biasing potential for the tube $T_1$, a battery $B_2$ and a potentiometer O are provided. A gas-filled discharge tube $T_2$ has its electrodes connected across resistance N. In order to provide a biasing potential for the tube $T_2$, the battery $B_2$ and the potentiometer Q are provided. The gas-filled tubes $T_1$ and $T_2$ might, for example, have a gaseous content such as neon or argon.

As heretofore pointed out, the network comprising resistances $S_1$, $S_2$ and condenser $C_1$ is connected across diagonally opposite points of the Wheatstone bridge. If the bridge is balanced there will be no potential difference across the plates of condenser $C_1$, and the potential on the grids of tubes $T_3$ and $T_4$ will be the same. Accordingly, the currents in the plate circuits of the tubes $T_3$ and $T_4$ will be equal, and the voltage drops across M and across N will be equal. If the Wheatstone bridge now becomes unbalanced due, for example, to a change in resistance of L, there will be a difference in potential across $C_1$ and different potentials will be applied to the grids of the tubes $T_3$ and $T_4$. This will cause a difference in the current flow in the plate circuits of the tubes $T_3$ and $T_4$, and hence the voltage drop across resistance M will be different from the voltage drop across resistance N. It will thus be seen that if the bridge becomes unbalanced that the voltage across the electrodes of the gas-filled discharge tubes $T_1$ and $T_2$ will be varied. This effect may be utilized in a manner to be pointed out in more detail hereinafter to cause either of the gas-filled tubes to operate. The operation of either of the tubes will operate relay mechanism to drive the motor 21 in the proper direction to cause the potentiometer switch 22 to rebalance the Wheatstone bridge.

In the push-pull type amplifier of Fig. 1 there will be no potential across $C_1$ when the Wheatstone bridge is balanced and under such conditions there will be equal and opposite potentials across resistances M and N. If the bridge becomes unbalanced and a potential of a certain polarity is impressed across $C_1$, the drop across M will be increased and that across N will be decreased. If the bridge becomes unbalanced in the other direction and a potential of the opposite polarity is impressed across $C_1$, the drop across M will be decreased and the drop across N will be increased. As heretofore pointed out, the battery $B_2$ and resistances O and Q provide a potentiometer arrangement for setting the biasing potentials of tubes $T_1$ and $T_2$. In general, $B_2$ should be of the order of or larger than the potential required to operate either of the tubes $T_1$ or $T_2$. It is then possible to adjust the potentials on $T_1$ and $T_2$, which are for $T_1$ the sum of the drops across the part of resistance O in use and the resistance M, and for $T_2$ the sum of the drops across the part of resistance Q in use and the resistance N added algebraically. For example, assuming that tubes $T_1$ and $T_2$ each operates at a potential of 115 volts and that with no potential across $C_1$ there is a drop across M and N each of 10 volts in such a direction that the potential in each of the tubes is 10 volts plus 100 volts derived from the potentiometers O and Q, or normally 110 volts each. Separate adjustment is provided in order to make it possible to compensate for small individual variations in the tubes.

Assuming then that a potential due to unbalance of the Wheatstone bridge is impressed across $C_1$ of the proper polarity and magnitude to cause the drop across M to be changed from 10 volts to 15 volts and across N from 10 volts to 5 volts, the potential across tube $T_1$ will be 115 volts and the tube $T_1$ will operate. The potential across tube $T_2$ will be reduced to 105 volts. For an equal potential of opposite polarity due to unbalance of the bridge in the opposite direction, the situation will be reversed and tube $T_2$ will be operated.

For an amplifier not of the push-pull type such, for example, as amplifier $T_5$ of Fig. 2, a similar set of conditions can be originated except that where the drops across M and N are each normally 10 volts with no potential impressed across $C_1$, a potential due to unbalance of the bridge of a given size and polarity might cause each of the potentials across M and N to increase to 15 volts, and an equal and opposite polarity would cause the potentials across M and N each to decrease to 5 volts. In order to secure operation of tube $T_1$ in the first case, i. e., 15 volts across M and 15 volts across N, and of tube $T_2$ in the second case, i. e., 5 volts across M and 5 volts across N, it is necessary to consider the polarity of these voltages and to arrange the bias potentials supplied by O and Q accordingly. For instance, if the bias potential supplied by O is 100 volts and that supplied by Q is 120 volts, the potential normally across tube $T_1$ would be 100+10, or 110 volts, and that across $T_2$ 120−10, or 110 volts, with no potential impressed across $C_1$. With a potential across $C_1$ so that the drops across M and N are each 15 volts, the potential across $T_1$ will be 100+15 and $T_1$ will operate. The potential across $T_2$ would be 120−15, or 105 volts. For an equal and opposite potential across $C_1$ causing potentials across M and N of 5 volts each, the potential across $T_1$ would be 100+5, or 105 volts, and that across $T_2$ would be 120−5, or 115 volts, and $T_2$ would operate. Thus it is seen that the same purpose can be obtained with different kinds of amplifiers, said amplifiers being multistage if desired. In an A. C. system, the use of an amplifier-detector would be possible to supply the necessary drops across M and N. The use of gas-filled tubes for $T_1$ and $T_2$ having grids, does not alter the sense of the invention but merely changes the value and arrangement of the bias potentials.

The operation of tubes $T_1$ and $T_2$ is arranged to operate relays $R_1$ and $R_2$, respectively, from the discharge current. Due to the inherent nature of the gas-filled tubes they will, for the conditions outlined, remain operated, since, in general, the release potential is very much lower than the firing potential and may be, for example, in the case noted, of the order of 70 volts. It is necessary then, in order to release tubes $T_1$ and $T_2$ and their associated relays $R_1$ and $R_2$, to reduce the potential sufficiently or open the circuit, which function is accomplished by contacts of relay $R_5$ when the occasion arises.

The operation of relay $R_1$ will close the following circuit; from ground, armature and contact of $R_1$, conductor 23, winding of relay $R_3$, to battery $B_5$ and ground. This will operate relay $R_3$ which will pull up its armature and close the following circuit; from ground, contact and armature of relay $R_3$, conductor 24, winding of relay $R_7$, to battery $B_4$ and ground. This will operate relay $R_7$ which will pull up its armature and close the following circuit; from the positive side of battery $B_3$, contact and armature of relay $R_7$, conductor 25, armature winding of motor 21, conductor 26, to the negative side of battery $B_3$. The operation of relay $R_7$ will also close the following circuit; from the positive side of battery $B_3$, contact and armature of relay $R_7$, conductor 25, contact 27 and armature 29 of relay $R_6$, conductor 30, field winding of motor 21, conductor 31, armature 40 and contact 32 of relay $R_6$, conductor 26, to the negative side of battery $B_3$. Thus it will be seen that when the gas-filled tube $T_1$ operates and causes the operation of relays $R_1$, $R_3$ and $R_7$, that the current flow through the field winding of the motor 21 will be in a certain direction, as, for example, from conductor 30 to conductor 31. This will cause the motor to rotate the shaft 7 in a certain direction and operate the switch 22 in the proper direction to reduce the unbalance potential of the Wheatstone bridge which caused $T_1$ to operate. The operation of relay $R_2$ will close the following circuit; from ground, armature and contact of relay $R_2$, conductor 35, winding of relay $R_4$, conductor 36, to battery $B_5$ and ground. This will operate relay $R_4$ which will pull up its armature and close the following circuit; from ground, contact and armature of relay $R_4$, conductor 37, winding of relay $R_6$, conductor 38, to battery $B_4$ and ground. This will operate relay $R_6$ which will pull up its upper armature and close the following circuit; from ground, upper armature and contact of relay $R_6$, conductor 34, winding of relay $R_7$, to battery $B_4$ and ground. This will operate relay $R_7$ which in the same manner will apply current from battery $B_3$ to the armature winding of motor 21. Due to the fact that relay $R_6$ is now operated, the operation of relay $R_7$ will now cause current from battery $B_3$ to be applied to the field winding of motor 21 in the following manner: from the positive side of battery $B_3$, contact and armature of relay $R_7$, conductor 25, contact 28 and armature 40 of relay $R_6$, conductor 31, field winding of motor 21, conductor 30, armature 29 and contact 33 of relay $R_6$, to the negative side of battery $B_4$. In other words, when relays $R_2$, $R_4$, $R_6$ and $R_7$ are operated, the current flow through the field winding of motor 21 will be the reverse from that heretofore described in connection with the operation of relays $R_1$, $R_3$ and $R_7$. Accordingly, the motor will operate the shaft 7 in the opposite direction and thus operate switch 22 in the proper direction to reduce the unbalance potential of the Wheatstone bridge which caused $T_2$ to operate.

The differences between Figs. 1 and 2 will now be pointed out.

In Fig. 1, which is so arranged as to balance the bridge in steps of predetermined amount, the driving motor, acting through a gear reducer device 41, controls a shaft 7, which operates the balancing potentiometer X—Y, and has attached to it a toothed wheel 1 engaging a roller 2, carried by arm 3, supported by fulcrum 4, and engaging contacts 5 and 6. Normally, when the bridge is in the balanced condition, roller 2 is in a depression of wheel 1, and arm 3 is engaged with contact 5, condenser $C_2$ is connected to th winding of relay $R_5$ and is in the discharged condition. $R_5$ is, accordingly, in the non-operated position.

Assume an unbalance potential to be impressed across $C_1$, as described above, sufficient to cause tubes $T_1$ or $T_2$ to fire, operating relays $R_1$ or $R_2$, and later relays $R_3$ or $R_4$, and causing the driving motor to rotate in one direction or the other, shaft 7 and the associated wheel 1 and potentiometer X—Y, to rotate in one direction or the other, depending upon the polarity of the unbalance potential across $C_1$. Tubes $T_1$ or $T_2$ will remain broken down and the aforesaid operation will continue, roller 2 being raised from a depression of wheel 1 until arm 3 makes engagement with contact 6, charging condenser $C_2$ to the potential of battery $B_6$. Wheel 1 will continue to rotate until roller 2 again approaches a depression, whereupon arm 3 again makes engagement with contact 5, discharging condenser $C_2$ through the winding of relay $R_5$, and momentarily operating relay $R_5$.

The momentary operation of relay $R_5$ opens the circuit 42 supplying battery for the potentiometers O and Q and permits the tubes $T_1$ or $T_2$ to be extinguished, releasing the associated relays $R_1$ and $R_2$ and subsequently $R_3$ or $R_4$, and stopping thereby the action of the driving motor and its associated train, shaft 7, wheel 1, and potentiometer X—Y.

During the aforesaid operation in which wheel 1 has been advanced one tooth in one direction or the other, and its associated potentiometer X—Y changed a corresponding amount, the balance of the bridge has been corrected by this said amount. It may be that this said amount of correction is sufficient so that upon restoral of battery to tubes $T_1$ and $T_2$ by the restoral of relay $R_5$ the unbalance potential across $C_1$ will be insufficient to cause tubes $T_1$ or $T_2$ to fire and, accordingly, the arrangement remains quiescent until such time as the unbalance across $C_1$ shall have increased to a sufficient amount to cause tubes $T_1$ or $T_2$ to fire. If, however, one step has been insufficient to reduce the unbalance potential to the point where tubes $T_1$ or $T_2$ will not fire, tubes $T_1$ or $T_2$ will fire a second time and the action described above will be repeated until a sufficient number of steps has been made to render the unbalance potential across $C_1$ too small to fire $T_1$ or $T_2$. It should be borne in mind that the margin of operation should be such that the apparatus will not hunt, i. e., step too far and step back, repeatedly oscillating, unless this condition is desired.

The shaft 7 can be extended to control resistances in other circuits, or to do any useful work which might ordinarily be accomplished by controlled rotary motion.

The action of the arrangements of Fig. 2 is substantially similar to that of Fig. 1. The toothed wheel and its associated apparatus are removed and relay $R_5$, controlling the circuit 42 supplying potential to $T_1$ and $T_2$, is associated with another relay $R_8$ in such a way that when $R_3$ or $R_4$ has operated, for reasons noted above, and the balance is being adjusted through changes in potentiometer X—Y, relay $R_5$ repeatedly operates at close intervals under control of relay $R_8$ in the following manner: Relays $R_3$ and $R_4$ are each provided with two armatures and two contacts. When either of these relays operate the following circuit will be closed; from ground and over a contact and armature of either relay $R_3$ or $R_4$, to conductor 43, and thence through the winding of relay $R_5$, contact and armature of relay $R_8$ to battery $B_7$ and ground. This will cause the operation of relay $R_5$ which will pull up its armature and open circuit 42 supplying potential from battery $B_2$ to the tube $T_1$ and $T_2$ and cause these tubes to be extinguished. The operation of relay $R_5$ will cause it to close its left-hand armature and contact and close the following circuit; from ground and battery $B_7$, winding of relay $R_8$, armature and left-hand contact of relay $R_5$, and thence over conductor 43 to ground by way of an armature and contact of either relay $R_3$ or $R_4$. It is pointed out that these latter relays are slow releasing and will remain operated for an interval after tubes $T_1$ and $T_2$ are extinguished. The operation of relay $R_8$ will open the circuit for relay $R_5$ and cause it to release. The release of $R_5$ will cause relay $R_8$ to release. The release of $R_8$ will again close a circuit for $R_5$ and cause it to operate again as long as $R_3$ or $R_4$ are operated. This cycle of events will continue as long as either $R_3$ or $R_4$ are operated. With each operation of $R_5$, battery $B_2$ is removed from potentiometer O and Q and consequently from tubes $T_1$ and $T_2$ permitting their release and the release of $R_1$ and $R_2$. Restoral of $R_5$ restores the battery $B_2$ to the tubes $T_1$ and $T_2$ and permits one of them to operate again in case the unbalance potential has been insufficiently reduced. This release and operation will continue until the unbalance potential is reduced sufficiently so that tube $T_1$ and $T_2$ will not operate. Relays $R_3$ and $R_4$ should preferably be of the slow release type so that their operation will hold over momentary releases of $R_1$ and $R_2$, but will release when $T_1$ or $T_2$ refuses to operate again upon restoral of battery $B_2$.

As in the case of Fig. 1, shaft 7 can be utilized for any useful control purpose.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. A Wheatstone bridge, a potentiometer included in one of the ratio arms of said bridge, a circuit connected across diagonally opposite points of said bridge, two resistance elements connected in said circuit, two gas-filled discharge tubes having their cathode-anode circuits connected across said resistances, the circuits of said tubes and the values of said resistances being so proportioned and adjusted that when said bridge is balanced said tubes will be in a non-discharging condition and when said bridge is unbalanced either of said tubes will discharge, means controlled by the operation of either of said tubes for varying the setting of said potentiometer to restore the balance of said bridge, and means controlled by the operation of either of said tubes for restoring the tubes to a non-operative condition.

2. A Wheatstone bridge, a potentiometer included in one of the ratio arms of said bridge, a circuit connected across diagonally opposite points of said bridge, an amplifier included in said circuit, two resistance elements included in the output circuit of said amplifier, two gas-filled discharge tubes having their cathode-anode circuits connected differentially with respect to each other across said resistances, each of said resistances and each of said cathode-anode circuits being so adjusted that when said bridge is unbalanced in one respect the voltage drop across one of said resistances will cause the operation of one of said tubes and when said bridge is unbalanced in another respect the voltage drop across the other of said resistances will cause the operation of the other of said tubes, means controlled by the operation of said gas-filled discharge tubes for changing the setting of said potentiometer to restore said bridge to a balanced condition, and means controlled by the operation of either of said tubes for restoring the tubes to a non-operative condition.

3. A Wheatstone bridge, a potentiometer included in one of the ratio arms of said bridge, a circuit connected across diagonally opposite points of said bridge, an amplifier included in said circuit, two resistance elements included in the output circuit of said amplifier, two gas-filled discharge tubes having their cathode-anode circuits connected differentially with respect to each other across said resistances, each of said resistances and each of said cathode-anode circuits being so adjusted that when said bridge is unbalanced in one respect the voltage drop across one of said resistances will cause the operation of one of said tubes and when said bridge is unbalanced in another respect the voltage drop across the other of said resistances will cause the operation of the other of said tubes, means controlled by the operation of said gas-filled discharge tubes for changing the setting of said potentiometer to restore said bridge to a balanced condition, and means controlled by the operation of said last mentioned means for intermittently opening the cathode-anode circuits of said gas-filled discharge tubes.

4. A Wheatstone bridge, a potentiometer included in one of the ratio arms of said bridge, a circuit connected across diagonally opposite points of said bridge, an amplifier included in said circuit, two resistance elements included in the output circuit of said amplifier, two gas-filled discharge tubes having their cathode-anode circuits connected differentially with respect to each other across said resistances, each of said resistances and each of said cathode-anode circuits being so adjusted that when said bridge is unbalanced in one respect the voltage drop across one of said resistances will cause the operation of one of said tubes and when said bridge is unbalanced in another respect the voltage drop across the other of said resistances will cause the operation of the other of said tubes, means controlled by the operation of said gas-filled discharge tubes for changing the setting of said potentiometer in a step-by-step manner to restore said bridge to a balanced condition, and means controlled by the operation of said last mentioned means and operating for each step that said potentiometer setting is changed for momentarily opening the cathode-anode circuits of said tubes.

5. A Wheatstone bridge, a potentiometer included in one of the ratio arms of said bridge, a circuit connected across diagonally opposite points of said bridge, an amplifier included in said circuit, two resistance elements included in the output circuit of said amplifier, two gas-filled discharge tubes having their cathode-anode circuits connected differentially with respect to each other across said resistances, each of said resistances and each of said cathode-anode circuits being so adjusted that when said bridge is unbalanced in one respect the voltage drop across one of said resistances will cause the operation of one of said tubes and when said bridge is unbalanced in another respect the voltage drop across the other of said resistances will cause the operation of the other of said tubes, relay means controlled by the operation of one of said tubes, relay means controlled by the operation of the other of said tubes, a motor, means controlled by said motor for changing the setting of said potentiometer, means controlled by one of said relay means for operating said motor in one direction, means controlled by the other of said relay means for operating said motor in another direction, and means controlled by either of said relay means for restoring the tubes to a non-operative condition.

6. A Wheatstone bridge, a circuit connected across diagonally opposite points of said bridge, a push-pull amplifier in said circuit, resistances in the plate circuit of said push-pull amplifier, two gas-filled discharge tubes connected across said resistances, one of said tubes being adjusted to operate on the voltage drop through its associated resistance when said bridge becomes unbalanced in one respect, the other of said tubes being adjusted to operate on the voltage drop through its associated resistance when said bridge becomes unbalanced in the opposite respect, means controlled by the operation of each of said tubes for restoring said bridge to a balanced condition, and means controlled by each of said tubes for restoring the tubes to a non-operative condition.

SAMUEL PAUL SHACKLETON.
PAUL GRIFFITH EDWARDS.